US009610992B2

(12) United States Patent
Hösker

(10) Patent No.: US 9,610,992 B2
(45) Date of Patent: Apr. 4, 2017

(54) OVERHEAD CONVEYING DEVICE HAVING A SECURING ELEMENT

(71) Applicant: Torsten Hösker, Osterburken (DE)

(72) Inventor: Torsten Hösker, Osterburken (DE)

( * ) Notice: Subject to any disclaimer, the term of this patent is extended or adjusted under 35 U.S.C. 154(b) by 0 days.

(21) Appl. No.: 14/900,335

(22) PCT Filed: May 22, 2014

(86) PCT No.: PCT/EP2014/060534
§ 371 (c)(1),
(2) Date: Apr. 11, 2016

(87) PCT Pub. No.: WO2015/000636
PCT Pub. Date: Jan. 8, 2015

(65) Prior Publication Data
US 2016/0214667 A1    Jul. 28, 2016

(30) Foreign Application Priority Data

Jul. 5, 2013 (DE) .................. 10 2013 213 223

(51) Int. Cl.
*B65G 47/00* (2006.01)
*B62D 65/18* (2006.01)
(Continued)

(52) U.S. Cl.
CPC ........... *B62D 65/18* (2013.01); *B65G 41/006* (2013.01); *B65G 43/00* (2013.01); *B65G 2812/02108* (2013.01)

(58) Field of Classification Search
USPC ............ 198/346, 346.3, 465.4, 860.1, 861.1
See application file for complete search history.

(56) References Cited

U.S. PATENT DOCUMENTS

2011/0154654 A1*  6/2011  Cardani .................. B23P 19/06
29/795

FOREIGN PATENT DOCUMENTS

DE      3607020 A1    9/1986
DE     19806963 A1   10/1998
(Continued)

OTHER PUBLICATIONS

PCT International Search Report, PCT/EP2014/060534, Sep. 19, 2014.
(Continued)

*Primary Examiner* — Leslie A Nicholson, III
*Assistant Examiner* — Lester Rushin
(74) *Attorney, Agent, or Firm* — Quarles & Brady LLP

(57) ABSTRACT

An overhead conveying device includes a conveying device mounted on supporting framework. The supporting framework and the conveying device form a conveying corridor. At least one securing element can be arranged at an input point and/or output point of the supporting framework, and the securing element can be moved between a securing position and an opening position. The securing element functions in the securing position as fall protection and at least partially blocks the initial cross-section and/or terminal cross-section of the conveying corridor. In the opening position, the securing element releases the initial cross-section and/or terminal cross-section of the conveying corridor for the transport of components with the help of the conveying device.

13 Claims, 4 Drawing Sheets

(51) Int. Cl.
*B65G 41/00* (2006.01)
*B65G 43/00* (2006.01)

(56) References Cited

FOREIGN PATENT DOCUMENTS

| | | |
|---|---|---|
| DE | 60202985 T2 | 4/2006 |
| DE | 202005015118 U1 | 3/2007 |
| DE | 102007009783 A1 | 7/2008 |
| DE | 202009006856 U1 | 9/2009 |
| DE | 102012214127 A1 | 2/2014 |
| EP | 2340982 A1 | 6/2011 |
| JP | 2003341818 A | 12/2003 |
| JP | 2008222137 A | 9/2008 |

OTHER PUBLICATIONS

PCT English Language Translation of the International Preliminary Report on Patentability, PCT/EP2014/060534, Jan. 14, 2016.

* cited by examiner

OVERHEAD CONVEYING DEVICE HAVING A SECURING ELEMENT

CROSS-REFERENCE TO RELATED APPLICATIONS

This application represents the national stage entry of PCT International Application No. PCT/EP2014/060534 filed May 22, 2014 and claims priority to German Patent Application No. 10 2013 213 223.9 filed Jul. 5, 2013. The contents of this application are hereby incorporated by reference as if set forth in their entirety herein.

STATEMENT REGARDING FEDERALLY SPONSORED RESEARCH OR DEVELOPMENT

Not applicable.

FIELD OF THE INVENTION

The invention relates to an overhead conveying device for integration in an assembly plant, which is suitable for transporting vehicle components.

BACKGROUND OF THE INVENTION

In assembly plants for manufacturing vehicles, different types of conveying devices as well as of overhead conveying devices are employed. Based on the fact that assembly plants are individually adjusted to each type of vehicle to be manufactured and that the conveying devices are correspondingly configured, the overhead conveying devices under consideration are correspondingly individually designed and manufactured. Here, an overhead conveying device of the type at hand relates to those conveying devices below which at least enough free movement space remains to allow a person to freely walk below them. Usually, free headroom of at least 2.5 m or more is the aim so that forklift trucks or other vehicles are also able to cross below the overhead conveying device. Overhead conveying devices of this kind are also employed in order to obtain additional assembly space, wherein, standing on the floor, another conveying device or another kind of assembly machine, such as an assembly robot, may be arranged underneath the overhead conveying device. To integrate overhead conveying devices of this kind into a complete assembly plant in a building, it is common in the state of the art to put a supporting framework together from steel girders or the like for erecting the actual conveying device on-site in the building, wherein the struts and pillars are usually welded together on the construction site. This allows for an adaptation to the conditions at hand both with regard to the assembly plants and with regard to the facilities of the building, and assembly plants or building facilities already present can in particular be taken into account.

For a start, the generic overhead conveying device is intended for integration in an assembly plant for transporting vehicle components. The type of the vehicle components is irrelevant in this case. The substantial feature is that the overhead conveying device is integrated in a complete assembly concept, making it possible here to manufacture a vehicle by transporting the assigned vehicle parts. For this purpose, the overhead conveying device has a supporting framework and at least one conveying device.

Generically speaking, the supporting framework has a length greater than 5 m and a width greater than 2 m. The height at which the supporting framework of the overhead conveying device is affixed above the floor of the designated building is irrelevant for the invention at hand, but the free headroom below the supporting framework has to be at least 2 m so as to guarantee a suitable useful height below the supporting framework. The supporting framework itself is realized by longitudinally and/or transversely oriented or diagonally interconnected supporting beam elements. Said supporting beam elements are usually designed in the shape of rods and can have tubular profiles, T-girders or other shapes and they can be designed as traction girders, pressure girders or as girders under a bending moment.

The associated conveying device is mounted on the supporting framework and allows transporting corresponding vehicle components, the transport usually taking place along the longitudinal direction of the overhead conveying device.

Furthermore, the supporting framework comprises bearing means on which the overhead conveying device is borne in the assembly plant. It is initially irrelevant whether said bearing means are fixed bearings, mobile bearings or other types of bearings. The supporting framework is at least substantially supported on the bearing means in the direction of gravity and on counter-bearings being provided by the assembly plant or by the building.

The design of an overhead conveying device known from the state of the art is disadvantageous in the light of the lack of fall protection in the area of the supporting framework when maintenance works are being carried out.

Due to their function for transporting vehicle components, the supporting frameworks, at the initial cross-section of the input point or at the terminal cross-section of the output point, do not have any fall protection since the material flow into the conveying corridor or out of the conveying corridor would otherwise not be possible. This missing fall protection in the area of the input point or of the output point then adds up to a high risk of accidents when maintenance workers have to enter the conveying corridor for maintenance works. This is because the conveying corridor, in generic overhead conveying devices, is situated at a significant height. That is because the lower edge of the conveying corridor is generally situated 3 to 4 m above the floor of the assembly hall. If a maintenance worker falls down onto the floor of the assembly hall from this height, this may lead to serious injuries. The fall protection of known overhead conveying devices is thus imperfect.

SUMMARY OF THE INVENTION

It is the object of the invention at hand to improve the procedure of setting up an overhead conveying device in an assembly plant to avoid the described disadvantages. This object is attained by an overhead conveying device, such as described herein.

The basic idea of the overhead conveying device in accordance with the invention is that a securing element is disposed at the input point and/or at the output point of the supporting framework. Said securing element can be moved between a securing position and an opening position. In the securing position, the securing element functions as a fall protection. Hereunto, the initial cross-section and/or the terminal cross-section of the conveying corridor at the input point and/or at the output point are at least partially blocked by the securing element. Here, the extent to which the conveying corridor is closed off by the securing element is to be configured such that it is reliably precluded that a maintenance worker falls down when carrying out maintenance works in the conveying corridor.

In order to guarantee trouble-free material flow through the initial cross-section into the conveying corridor or through the terminal cross-section out of the conveying corridor, the securing element, in accordance with the invention, may be moved from its securing position into an opening position. In the opening position, the initial cross-section and/or the terminal cross-section of the conveying corridor is not blocked by the respective securing element and it is thus easily possible to transport vehicle components with the help of the conveying device.

In other words, this means that a fall protection, by moving the securing element from the opening position into the securing position, is created in the area of the input point or of the output point. Said fall protection may then be removed again by setting back the securing element from the securing position into the opening position in order to guarantee trouble-free material flow during normal operation of the overhead conveying device.

In order to guarantee an ultimately complete fall protection in the conveying corridor while carrying out maintenance works, a securing element should be disposed both at the initial cross-section and at the terminal cross-section. By arranging the two securing elements in their securing position, a maintenance corridor can be created, which is delimited on all sides and fall-protected, and whose dimensions correspond to the conveying corridor when the initial or terminal cross-section is closed.

In order to be able to guarantee a defined arrangement of the securing element in the securing position or in the locking position, it is particularly advantageous if a locking device is disposed at the securing element, with the help of which device the securing element may be arrested in the securing position or in the opening position. In this manner, it is possible, by arresting the securing element in the securing position or in the opening position, to generate a defined operating state regarding the fall protection.

Regarding the operating safety, the position of the securing element in its securing position or in its opening position represents important information. For instance, other operating states, for example the release of the production plant or an emergency stop, may be made dependent on the position of the securing element. In order to make the information on the position of the securing element available on the IT system, is it therefore particularly advantageous if a position sensor is disposed, with the help of which the position of the securing element in the securing position or in the opening position can indirectly or directly be detected and be output as a position signal.

In terms of construction, realizing a position sensor may be guaranteed in a particularly simple fashion if the position sensor is incorporated into the locking device. This is because, in the locking device, in a simple manner, a separate locking state may be defined for each of the two positions of the securing element and be detected with the help of the position sensor.

The manner in which the information from the position sensor on the position of the securing element is used is generally optional. Regarding operating safety, it is particularly important if the conveying device and/or the entire overhead conveying device and/or parts of a production plant arranged at overhead conveying device can be shut down as a function of the position signal of the position sensor. If, for instance for carrying out maintenance works, the securing element is brought from its opening position into the securing position, this may be determined by the position sensor and the conveying device or the overhead conveying device or a production plant in the area of the convoying device may be shut down as a function of this in order to preclude accidents and injuries of the maintenance workers by the conveying device or the overhead conveying device or the production plant.

In order to make it possible for maintenance workers to establish the fall protection at the conveying corridor, in particular to establish a maintenance corridor, which is delimited on all sides and fall protected, before they enter the actual danger zone, it is particularly advantageous if the locking device interacts with an actuating device, by the actuation of which the locking device can be unlocked. As a result, remote control of the locking device by the maintenance workers is hence made possible, so that it is made possible to unlock the locking device by remote control. After unlocking the locking device, the securing element may then be brought from its opening position into its securing position by remote control, so that the conveying corridor has already been converted into a fall-protected maintenance corridor before the conveying corridor is entered by the maintenance workers.

In order to guarantee a high trouble safety of the remote control for moving the securing element from the opening position into the securing position, it is particularly advantageous if the securing element, when the locking device is unlocked, is automatically moved from the opening position into the securing position, in particular being actuated by spring force and/or by gravity. In other words, this means that it is achieved solely by unlocking the locking device that the securing element being situated in the opening position automatically passes into its securing position, without any further apparatus intervention.

The constructive embodiment of the securing element is generally optional as long as sufficient fall protection is guaranteed when arranging the securing element in its securing position. In terms of construction, the securing element may be realized in a particularly simple fashion by a safety barrier, which may be pivoted between a securing position and an opening position.

Regarding the necessary installation space and the necessary space for moving the safety barrier, it is particularly advantageous if the same, having hinges, is borne at one side in such a manner that the safety barrier may he pivoted horizontally about a vertical axis.

Regarding the fall protection, it is furthermore particularly advantageous if the safety barrier forms a safety fence, which blocks the entire area of the conveying corridor, in the area of the safety barrier.

Here, a passage opening may in turn be disposed in the safety fence itself, at which maintenance workers can pass the closed safety fence.

The passage opening itself in the safety fence may in turn be blocked with the help of a closing cover that is pivotably borne in order to complete the fall protection.

DETAILED DESCRIPTION OF THE EXAMPLE EMBODIMENTS

Figure 1:
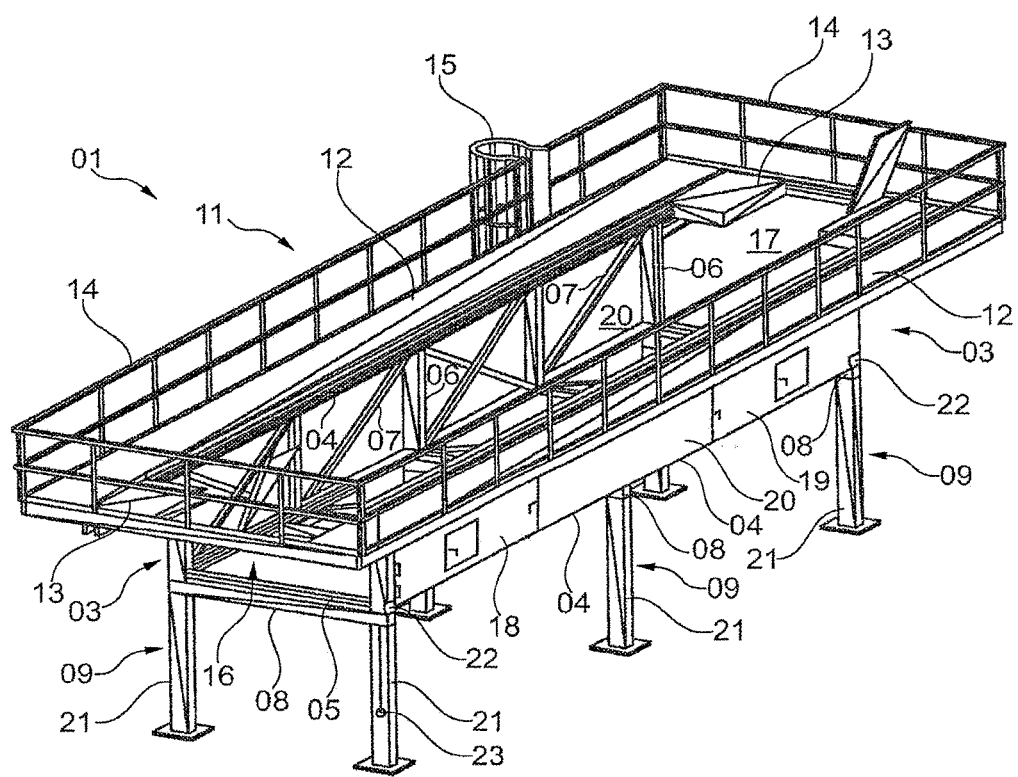
FIG. 1 shows a first exemplary overhead conveying device having securing elements arranged in the opening position, in a perspective view leaving out the conveying device.

In FIG. 1, a perspective illustration of an overhead conveying device 01 is outlined in an exemplary embodiment. Here, the conveying device that belongs to the overhead conveying device 01 was chosen not to be illustrated. The same is located, as the person skilled in the art will easily be able to understand, in the center of the supporting framework 03, protruding well beyond the supporting framework 03, depending on the embodiment.

The supporting framework 03 is designed in the manner of a truss and comprises a multiplicity of supporting beam elements 04-07 that are welded together. The supporting framework 03 is formed by longitudinally oriented supporting beam elements 04, transversely oriented supporting beam elements 05, upright supporting beam elements 06 as well as diagonal supporting beam elements 07. Here, the supporting framework 03 having the supporting beam elements 04, 05, 06 and 07 is designed such that, when the conveying device has been mounted thereon, there is sufficient self-supporting inherent stiffness, so that it is possible to transport the entire overhead conveying device 01 or at least individual supporting frameworks 03 having the conveying device mounted thereon. For this purpose, the supporting framework 03 is composed of two side parts and of a floor part. The side parts and the floor part each have an even component structure of high stiffness in the component plane. The side parts and the floor part are put together from the supporting beam elements 04, 05, 06 and 07. In view of stiffness, in particular bending stiffness, the supporting framework 03 is to be configured to the effect that bearing on the associated column gantries 09 is possible in a substantially deformation-free manner both in case of transport and for later erection.

In correspondence to the static configuration of the overhead conveying device 01, which has to be ascertained in each case, the supporting framework 03 is borne on a plurality of column gantries 09. Each column gantry 09 consists of two support columns 21 and of a transverse bridge 08 affixed in-between. Furthermore, in this embodiment example, the statics of the supporting framework 03 are configured and the stiffness is selected in such a manner that the stability of the entire arrangement is guaranteed even if individual support columns are omitted. Thus, it is conceivable on the one hand to employ only five of the illustrated six support columns 21 in case of erection in the assembly plant, and on the other hand it is also possible to use six support columns, in which case a support column can be replaced in case of damage resulting from a collision with a vehicle, for instance, without impairing the functionality of the overhead conveying device.

Furthermore, the maintenance scaffold 11 belonging to the overhead conveying device 01 is visible, having maintenance walkways 12 extending on both sides of the overhead conveying device, said scaffold being arranged at the upper side of the supporting framework 03. At their ends, said maintenance walkways 12 are connected to connecting girders 13, providing increased stability of the entire arrangement together with the maintenance scaffold 11 and of the maintenance walkways 12. A surrounding safety railing 14 guarantees the safety of maintenance personnel when accessing the maintenance walkway 12. Access to the maintenance walkway 12 is provided by ladders 15 arranged on the maintenance scaffold 11.

At the input point 16 of the supporting framework 03, vehicle components may be fed into the conveying corridor formed by the supporting framework 03. Said vehicle components, by means of the conveying device, which is not illustrated, are then conveyed along the conveying corridor 03 to the output point 17 and can there be taken on, for instance by an industrial robot. In order to transform the conveying corridor 03, for carrying out maintenance works, into a fall-protected maintenance corridor, a securing element 18 and 19 is disposed at each of the input point 16 and output point 17. Each of the securing elements 18 and 19 is embodied in the manner of horizontally pivotable safety barriers. In Fig. 1, each of the securing elements 18 and 19 is situated in its opening position, so that the material flow at the input point 16 or at the output point 17 is not impeded.

Figure 2:
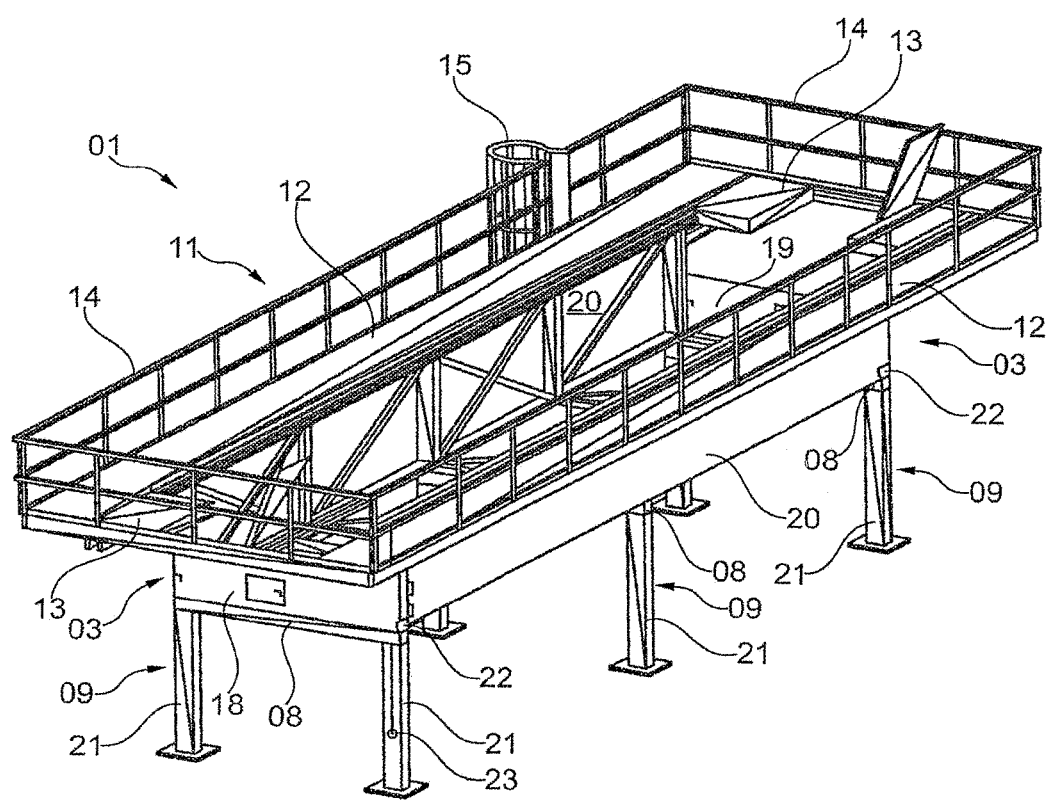
FIG. 2 shows the overhead conveying device in accordance with FIG. 1, having securing elements arranged in the securing position, in a perspective view.

FIG. 2 shows the overhead conveying device 01 having the two securing elements 18 and 19 in the respective securing position. In the securing position of the securing elements 18 and 19, the conveying corridor formed by the supporting framework 03 is closed at the initial cross-section and at the terminal cross-section. Moreover, the supporting framework 03 is covered with sheet metal planks 20 at the side parts and at the floor, so that a fall-protected maintenance corridor is developed by arranging the securing elements 18 and 19 in their securing position illustrated in FIG. 2, said corridor extending along the conveying corridor formed by the supporting framework 03, and being of equal size and form. In other words, this means that the maintenance workers, when entering the conveying corridor formed by the supporting framework 03, are not exposed to any risk of accidents, namely of falling down, as soon as the securing elements 18 and 19 are arranged in their securing position illustrated in FIG. 2.

For arresting the securing elements 18 and 19 in the opening position and in the securing position, locking devices 22 are disposed in the area of each of the vertical bearing axes. Said locking devices 22 may be remotely controlled and thus unlocked with the help of a switch 23, which can be reached from the factory floor. Here, the bearing axes of the securing elements 18 and 19 are arranged such that the securing elements 18 and 19, after the locking devices 22 have been unlocked, are automatically pivoted, being actuated by gravity, from the opening position illustrated in FIG. 1 into the locking positions illustrated in FIG. 2.

Figure 3:
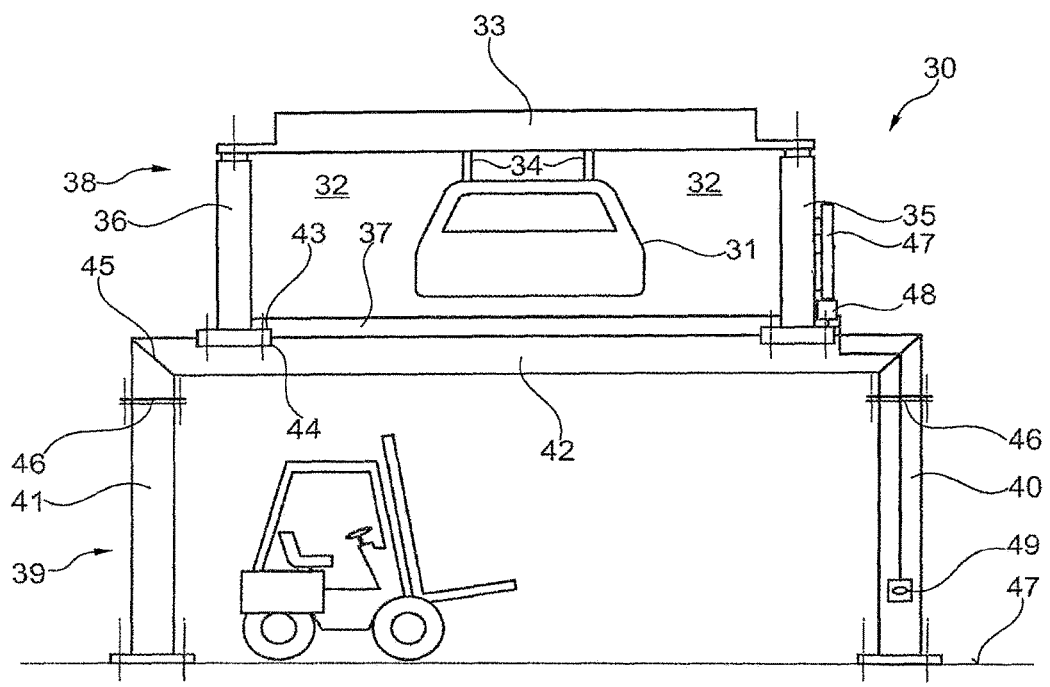
FIG. 3 shows a second exemplary overhead conveying device having a securing element arranged in the opening position, in a view from the front.

FIG. 3 shows a second overhead conveying device 30 in a view from the front. The overhead conveying device 30 is intended for transporting vehicle components 31 along a conveying corridor 32. Here, the actual conveying motion for transporting the vehicle components 31 is performed by a conveying device 33, for instance by a pushing conveyor. The conveying device 33 is fastened to the vehicle components 31 with the help of coupling members 34. At the sides, the conveying device 33 itself is placed on two side parts 35 and 36 and fastened thereto. The side parts 35 and 36 are connected to each other below the conveying corridor 32 by a floor part 37. Together, the two side parts 35 and 36 and the floor part 37 form a supporting framework 38, which has a U-shaped trough shape and limits the conveying corridor 32 to the sides and from below, respectively.

The supporting framework 38 is designed so as to be self-supporting and may be transported from a place of manufacture to the usage site in preassembled form. To manufacture the overhead conveying device 30, the self-supporting supporting framework 38 is placed from above onto several column gantries 39 that are arranged one behind the other and is fastened there. Each column gantry consists of two support columns 40 and 41 and of a transverse bridge 42 affixed between the two support columns 40 and 41. Fastening straps 43 and 44 are disposed at the lower ends of the side parts 35 and 36 and at the top side of the transverse bridge 42, respectively, said fastening straps 43 and 44 allowing the supporting framework 38 to be aligned on the column gantries 39 and to be subsequently fixed. The support columns 40 and 41 as well as the transverse bridge 42 have been manufactured from rectangular tubes and have a miter cut on each of their touching ends so that the surfaces of the terminal cross-sections of the two support columns come into flush contact with the surfaces of the terminal cross-sections of the transverse bridge. To connect the support columns 40 and 41 and the transverse bridge 42, the miter-cut terminal cross-sections have been welded together in welded seams 45.

In order to be able to transport the column gantries within very little transport space, the two support columns can be disassembled into two parts. For this purpose, connecting points 46 are in each instance disposed at the support columns 40 and 41, the support columns 40 and 41 being able to be disassembled into two parts at said points.

In FIG. 3, a securing element 47 is illustrated in its opening position. The securing element 47 may be arrested in the opening position illustrated in FIG. 3 with the help of a locking device 48. By actuating a switch 49, the locking device 48 may be unlocked by remote control.

Figure 4:
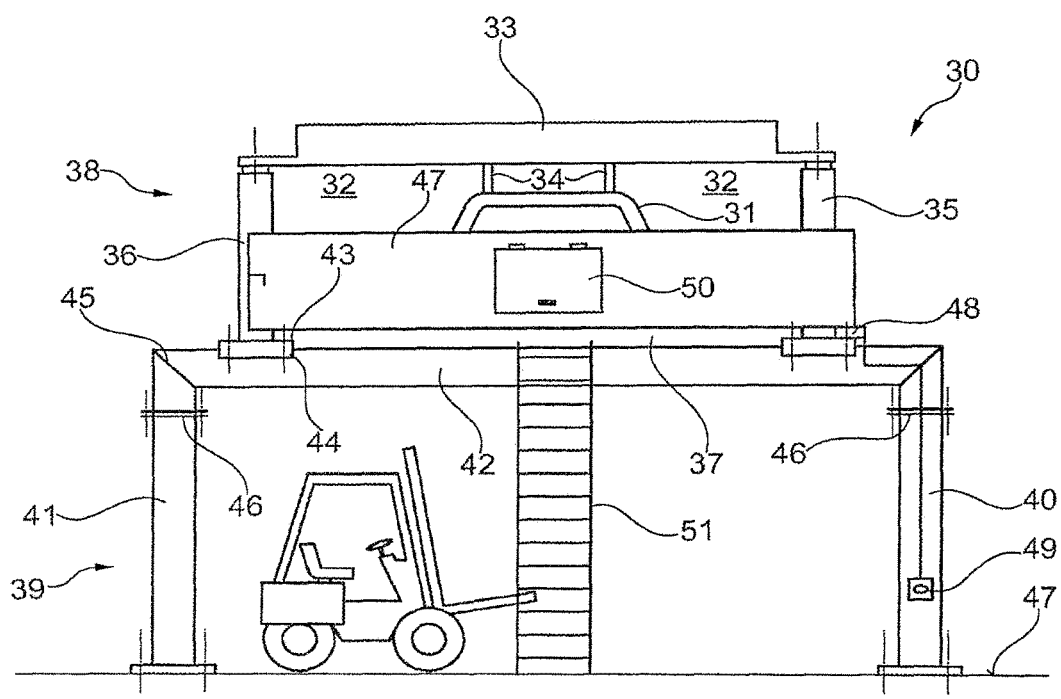
FIG. 4 shows the overhead conveying device in accordance with FIG. 3, having the securing element arranged in the securing position, in a view from the front.

FIG. 4 shows the overhead conveying device 30 after unlocking of the locking device 48. The securing element 47, after unlocking of the locking device 48, is pivoted, being actuated by gravity and thus automatically, into the securing position illustrated in FIG. 4 and blocks the conveying corridor 32. After the securing position has been reached, the securing element 47 may again be arrested with the help of the locking device 48. Here, a position sensor has been incorporated into the locking device 48, said sensor being able to detect the locking of the securing element 47 in the securing position illustrated in FIG. 4. This information is forwarded to the control of the overhead conveying device 30 in order to stop the conveying device 33 and to preclude collisions of the vehicle components 31 with the securing element 47. After establishing the fall protection in the conveying corridor 32, the maintenance workers may lean a ladder 48 against the overhead conveying device 30 and enter the conveying corridor 32 that has now been converted into a maintenance corridor. For this purpose, a passage opening is disposed in the securing element 37, said opening being closed with a closing cover 50 that is borne so as to be pivotable. For entering the conveying corridor 32, the maintenance workers may open the dosing cover 50 after having climbed the ladder 51 and may enter the conveying corridor through the passage opening lying behind and through the securing element 47.

The invention claimed is:

1. An overhead conveying device for integration in an assembly plant in order to transport components for integration in an assembly plant in order to transport components, said overhead conveying device comprising;
   a supporting framework having a length greater than 5 m and a width greater than 2 m;
   a conveying device mounted on the supporting framework, wherein the supporting framework and the conveying device form a conveying corridor, in which the components can be transported from an input point to an output point;
   support columns supporting the supporting framework, wherein a free space suitable for component assembly and/or component transport and which can be walked and/or driven through] is formed beneath the underside of the supporting framework; and
   at least one securing element arranged at the input point and/or output point of the supporting framework, wherein the securing element can be moved between a securing position and an opening position, and wherein the securing element functions in the securing position as fall protection and at least partially blocks an initial cross-section and/or terminal cross-section of the conveying corridor, and wherein, in the opening position, the securing element releases the initial cross-section and/or terminal cross-section of the conveying corridor for the transport of components with the help of the conveying device, wherein maintenance corridor, which is delimited on all sides and fall-protected, is formed by arranging the securing elements at the initial cross-section and terminal cross-section of the conveying corridor in the respective securing position.

2. The overhead conveying device according to claim 1, in which a position sensor is disposed, with the help of which the position of the securing element in the securing position and/or in the opening position can indirectly or directly be detected and be output as a position signal.

3. The overhead conveying device according to claim 2, in which the position sensor is integrated in the locking device.

4. The overhead conveying device according to claim 1, in which the conveying device and/or the entire overhead conveying device and/or parts of a production plant arranged at the overhead conveying device can be shut down as a function of the position signal of the position sensor.

5. The overhead conveying device according to claim 1, in which the securing element can be moved from the opening position into the securing position by remote control.

6. The overhead conveying device according to claim 1, in which the locking device interacts with an actuating device, by the actuation of which the locking device can be unlocked.

7. The overhead conveying device according to claim 1, in which the securing element, when the locking device is unlocked, is automatically moved from the opening position into the securing position by spring force and/or by gravity.

8. An overhead conveying device for integration in an assembly plant in order to transport components for integration in an assembly plant in order to transport components, said overhead conveying device comprising;
   a supporting framework having a length greater than 5 m and a width greater than 2 m;
   a conveying device mounted on the supporting framework, wherein the supporting framework and the conveying device form a conveying corridor, in which the components can be transported from an input point to an output point;
   support columns supporting the supporting framework, wherein a free space suitable for component assembly and/or component transport and which can be walked and/or driven through] is formed beneath the underside of the supporting framework; and
   at least one securing element arranged at the input point and/or output point of the supporting framework, wherein the securing element can be moved between a securing position and an opening position, and wherein the securing element functions in the securing position as fall protection and at least partially blocks an initial cross-section and/or terminal cross-section of the conveying corridor, and wherein, in the opening position, the securing element releases the initial cross-section and/or terminal cross-section of the conveying corridor for the transport of components with the help of the conveying device wherein the securing element may be arrested in the securing position and/or in the opening position with the help of a locking device.

9. An overhead conveying device for integration in an assembly plant in order to transport components for integration in an assembly plant in order to transport components, said overhead conveying device comprising:
- a supporting framework having a length greater than 5 m and a width greater than 2 m;
- a conveying device mounted on the supporting framework, wherein the supporting framework and the conveying device form a conveying corridor, in which the components can be transported from an input point to an output point;
- support columns supporting the supporting framework, wherein a free space suitable for component assembly and/or component transport and which can be walked and/or driven through] is formed beneath the underside of the supporting framework; and
- at least one securing element arranged at the input point and/or output point of the supporting framework, wherein the securing element can be moved between a securing position and an opening position, and wherein the securing element functions in the securing position as fall protection and at least partially blocks an initial cross-section and/or terminal cross-section of the conveying corridor, and wherein, in the opening position, the securing element releases the initial cross-section and/or terminal cross-section of the conveying corridor for the transport of components with the help of the conveying device wherein the securing element is a safety barrier.

10. The overhead conveying device according to claim 9, in which the safety barrier is horizontally pivotable.

11. The overhead conveying device according to claim 9, in which the safety barrier forms a safety fence blocking the entire area of the conveying corridor.

12. The overhead conveying device according to claim 11, in which the safety fence has a passage opening, at which maintenance workers can pass the closed safety fence.

13. The overhead conveying device according to claim 12, in which the passage opening in the safety fence can be blocked with the help of a pivotable closing cover.

* * * * *

UNITED STATES PATENT AND TRADEMARK OFFICE
CERTIFICATE OF CORRECTION

| | | |
|---|---|---|
| PATENT NO. | : 9,610,992 B2 | Page 1 of 1 |
| APPLICATION NO. | : 14/900335 | |
| DATED | : April 4, 2017 | |
| INVENTOR(S) | : Torsten Hösker | |

It is certified that error appears in the above-identified patent and that said Letters Patent is hereby corrected as shown below:

In the Specification

Column 1, Line 39:
"other vehicles" should be --other transport vehicles--

Column 3, Line 61:
"at overhead" should be --at the overhead--

Column 4, Line 1:
"convoying" should be --conveying--

Column 4, Line 42:
"he" should be --be--

Column 7, Line 52:
"dosing" should be --closing--

Column 8, Line 17:
"wherein maintenance" should be --wherein a maintenance--

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*